Dec. 12, 1961    H. GENSHEIMER ET AL    3,012,645
RATCHET-TYPE FRICTION COUPLING WITH CLAMPING ROLLERS
Filed April 28, 1959    2 Sheets-Sheet 1

INVENTORS
Heinrich GENSHEIMER
Christian GENSHEIMER
Valentin GENSHEIMER

BY
AGENT

Dec. 12, 1961  H. GENSHEIMER ET AL  3,012,645
RATCHET-TYPE FRICTION COUPLING WITH CLAMPING ROLLERS
Filed April 28, 1959  2 Sheets-Sheet 2

INVENTORS
Heinrich GENSHEIMER
Christian GENSHEIMER
Valentin GENSHEIMER

BY 
AGENT

United States Patent Office 3,012,645
Patented Dec. 12, 1961

3,012,645
RATCHET-TYPE FRICTION COUPLING WITH CLAMPING ROLLERS
Heinrich Gensheimer and Christian Gensheimer, Altleiningen, Pfalz, and Valentin Gensheimer, Carlsberg, Pfalz, Germany
Filed Apr. 28, 1959, Ser. No. 809,459
Claims priority, application Germany Apr. 30, 1958
4 Claims. (Cl. 192—45)

The present invention relates to friction couplings between a driving and a driven part, and more particularly to a ratchet-type device using clamping rollers for coupling an internal and an external ring.

Roller clutches, which run free in one direction and grip in the other direction to couple the driving part to the driven part, are generally known. Ratchet-type couplings or clutches of this type include an inner ring whose circumference essentially constitutes a ratchet wheel having sloping chambers between transverse bosses, the bottoms of the sloping chambers being formed by wedge faces. A concentrically mounted external ring surrounds the internal ring and its diameter is such that transverse clamping rollers may be placed into the sloping chambers in contact with the external ring. Biasing means is provided to press the clamping rollers outwardly but when the clamping rollers are positioned in the widest portion of the sloping chambers, the driving ring runs free in one direction, the slope of the wedge faces being in the direction of the free run. When the direction of rotation of the driving ring is reversed, the biasing means forces the clamping rollers into the narrow waist of the sloping chambers, thus coupling the other ring to the driving ring and driving it with and in the direction of rotation of the driving ring.

In known unidirectional friction couplings of this type, the biasing means is so arranged that the clamping rollers are wedged into the sloping chambers in a direction parallel to the axis of the sloping chambers to remain constantly in a state of coupling readiness. This causes constant friction between the rollers and the external ring as well as the wedge faces of the internal ring. While the driving ring runs freely in one direction, this friction causes a relative rotation between rotating ring and rollers while the rollers glide on the wedge faces of the ring which stands still. After a certain time of operation, this will cause the cylindrical surface of the rollers to be worn and to form plane surfaces so that the rollers will develop a polygonal instead of a circular circumference. On the other hand, the wedge faces on the inner ring will also be worn or grooved at the points of contact with the rollers, which will change the angle of slope. These circumstances will cause the coupling to fail, particularly since even small changes in the angle of slope lead to failure.

As pointed out hereinabove, while these known unidirectional couplings hold the clamping rollers in constant coupling readiness, they have the disadvantage that there is a gliding rather than a rolling friction between the driven ring and the rollers while the driving ring rotates freely. To avoid this, clamping roller couplings have been developed, which operate without biasing springs but these devices require extremely precise fits and their cost of manufacture is accordingly very high. In addition, certain tolerances are practically unavoidable so that not all the clamping rollers exert the required gripping action to assure fully effective coupling between the driving part and the driven part. Furthermore, the clamping rollers themselves are used as bearings for the smooth coupling part in these devices so that sufficient play between the rollers and the smooth coupling part must be provided to permit the latter part to rotate freely in one direction without driving the other part. All these factors mean that these springless devices operate very inaccurately.

While it has also been proposed to reduce the friction of the clamping rollers in unidirectional couplings by using spring-biased rollers instead of spring-actuated plungers, the above described objectional wear remains because there still remains the plane of frictional gliding contact between the clamping rollers and the wedge races of the one part during the free run of the other part.

It is the principal object of the present invention to overcome the disadvantages of the known unidirectional friction couplings wherein clamping rollers are permanently biased into coupling readiness by arranging the biasing means so that the rollers are lifted off the wedge faces of the one coupling part while the other coupling part runs freely in one direction whereby the decreased friction between the rollers and the other coupling part permits a free rolling movement which is transmitted from the latter coupling part to the rollers.

We accomplish this and other objects by biasing the clamping rollers so that the plane defining the direction of pressure on the rollers does not pass through the longitudinal axis of the rollers.

In accordance with one embodiment of the invention, the biasing means comprises balls pressed against the rollers by springs, the balls being arranged in bores extending inwardly from each wedge face at its lowest point and enclosing a slightly obtuse angle with the wedge face, the angle of the bores determining the direction of pressure of the biasing means.

According to one feature of the invention, the wedge faces are tangentially extending planes on the circumference of the internal coupling ring, said wedge faces defining sloping chambers between the external coupling ring and the internal ring, transverse bosses being provided between the sloping chambers and two transversely aligned ones of said bores being arranged adjacent each boss at the lowest point of each wedge face. The inclination of the bores in relation to the wedge face is preferably about 105°.

Accordingly to another feature, the external coupling ring may be carried by an anti-friction bearing mounted on the internal ring or by a pair of guide rings mounted on lateral extensions of the internal ring.

The spring means for biasing the balls against the rollers may be individual compression springs mounted in each bore. Alternatively, the circumference of the internal ring may have annular grooves holding a continuous spring biased against the balls. Furthermore, the balls may be omitted and, instead, a continuous sinuous spring may be provided in circumferential annular grooves in the internal ring surface to press directly against the rollers the only critical condition in all embodiments being that an off-center pressure can be exerted upon the rollers.

In all embodiments of the invention, the clamping rollers operate as an overrunning clutch riding downwardly in the sloping chambers against the bias of the springs pressing thereagainst when the driving coupling part rotates freely in one direction while they establish an increasingly snug fit and corresponding locking engagement between the driving part and the driven part when the rotational direction of the driving part is reversed.

The above objects, features and advantages of this invention will be more fully set forth in the following detailed description of certain preferred embodiments thereof, taken in conjunction with the accompanying drawing wherein FIG. 1 is a plan view, partly in section, of the friction coupling of the invention;

Figure 1:
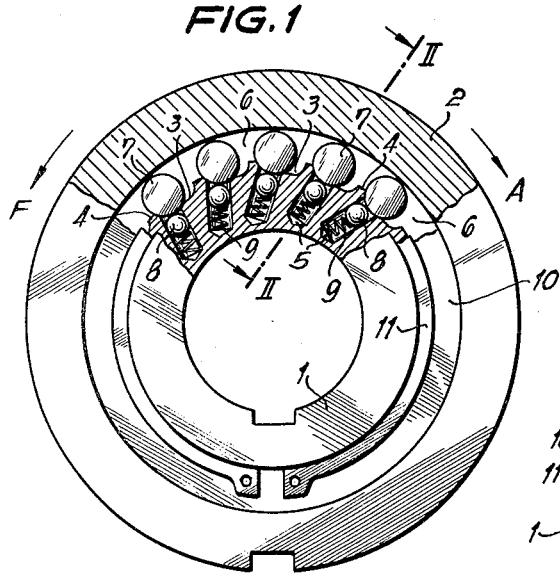
Figure 2:
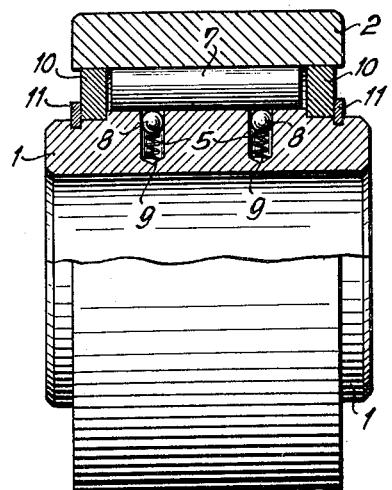
FIG. 2 is a side view of FIG. 1, showing the section along line II—II.
Figure 3:
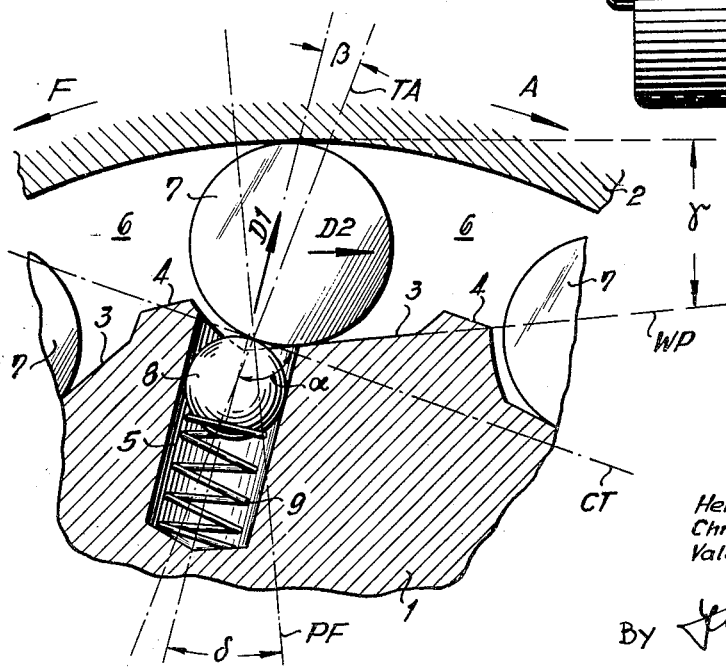
FIG. 3 shows certain details of FIG. 1, in an enlarged sectional view.

Referring now to FIGS. 1 to 3, the ratchet-type, clamping roller friction coupling is shown to comprise essentially an internal ring 1 and an external ring 2, the two rings being keyed to any shafts or other rotatable elements which are to be coupled. In the illustrated embodiment, the external ring is the driving part of the friction coupling or clutch. It has a smooth internal race and is arranged to rotate freely in the direction of arrow F. Internal ring 1 is the driven part and constitutes a ratchet means, its circumference carrying a plurality of spaced transverse bosses 4 separated by wedge-shaped troughs or face 3 which slope away from ring 2 in the direction of the free run of driving ring 2, i.e. in the direction of arrow F. Thus, a plurality of adjacent transverse sloping chambers 6 are formed between the external and internal rings. Each boss 4 is located adjacent the highest points of one sloping face 3 and the lowest point of the adjacent sloping face 3. At the lowest point of each sloping face 3, there are provided inwardly extending bores 5, two being shown (see FIG. 2) in the illustrated embodiment. The bores are inclined in relation to the plane WP of wedge face 3 at a slightly obtuse angle α. Clamping rollers 7 are mounted in sloping chambers 6 and are biased toward external or driving ring 8 by balls 8 mounted in bores 5, compression spring 9 pressing the balls outwardly.

As shown in FIG. 2, the external ring 2 is supported on guide rings 10 which are held in position by lock rings 11.

Enlarged FIG. 3 shows the critical relationship between the biasing means and rollers 7. Balls 8 exert an off-center pressure on clamping rollers 7. The central plane of the pressure direction, which is defined substantially by the longitudinal axes of the two transversely aligned bores 5, encloses an angle β with the plane TA passing through the longitudinal axis of roller 7 and being perpendicular to the contact tangent CT between balls 8 and roller 7. The direction of pressure is indicated by arrow D1. This off-center pressure on roller 7 transforms the radial pressure of spring 9 into a lateral pressure indicated by arrow D2. In this arrangement, the roller is always biased in the direction of the highest point of the wedge face 3, thus keeping the roller in coupling readiness.

When external ring 8 runs free in the direction of arrow F, it takes along the clamping rollers 7 from their coupling position at the narrowest point of sloping chamber 6 to the widest point of the sloping chamber near boss 4. During this movement, the rollers have a tendency of rolling over balls 8 but are prevented from doing so by the pressure from springs 9 which lifts the rollers away from boss 4. In this cycle of operations, the balls work like in an anti-friction bearing and permit the rollers 7 to execute a rolling motion corresponding to the free run of external ring 2.

As soon as the rotational direction of ring 2 is reversed and it turns in the direction of arrow A, rollers 7 instantaneously grip the internal ring 1, the pressure indicated by arrows D1, D2 wedging the rollers into the narrow waist of sloping chamber 6. The friction coupling is then in operative position and ring 1 is driven with and in the same direction as ring 2.

In FIG. 3, the angle γ indicates the slope of the wedge face 3, the plane PF perpendicular to the wedge plane WP and the pressure plane D1 enclosing an angle δ.

While the external ring 2 is shown mounted on ring 1 by means of guide rings 10, any other suitable mounting may be used, for instance, anti-friction bearings and like mechanical means.

Figure 4:
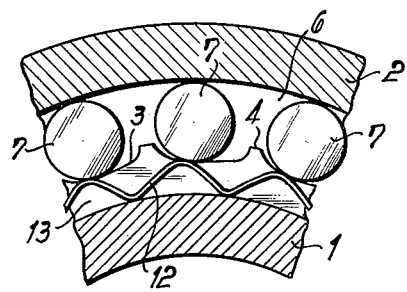
FIG. 4 shows a modified embodiment of the biasing means for the clamping rollers of the coupling.

FIG. 4 illustrates a modified embodiment of the ratchet-type friction coupling of this invention, with like reference numerals indicating those coupling parts which are the same as in the embodiment of FIGS. 1 to 3. The only difference between the embodiment of FIG. 4 and that of FIGS. 1–3 lies in the means for biasing clamping rollers 7. As shown in FIG. 4, the individual bores 9 are replaced by circumferentially extending annular grooves 13 in the surface of internal ring 1, at least two such grooves being provided, which is comparable to the pairs of adjacent bores 5. A continuous sinuous spring 12 is mounted in each groove 13, the bottom of the groove forming one shoulder for the spring while its other shoulder is formed by rollers 7. As in the embodiment of FIGS. 1 to 3, the biasing means, i.e. spring 12, contacts the surface of rollers 7 off center so that it exerts the same wedging action as described in connection with the first-described embodiment.

Figure 5:
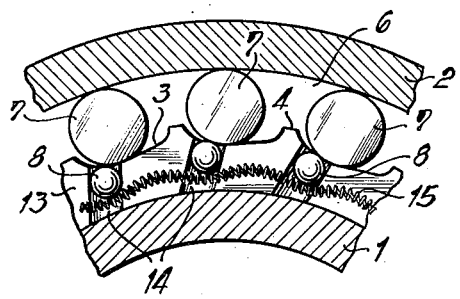
FIG. 5 illustrates yet another embodiment of the biasing means.
Figure 6:
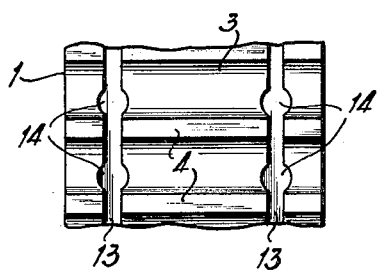
FIG. 6 is a top view of a portion of the internal ring of FIG. 5.
Figure 6:

FIGS. 5 and 6 show a further variation of the biasing means for rollers 7. In this case, spaced cylindrical bores 5 are provided in addition to the circumferential annular grooves 13, bores 5 holding balls 8, similarly to the embodiment of FIGS. 1 to 3. The sinuous leaf spring 12 is here replaced by a tensioned continuous spiral spring 14 mounted in grooves 13 and pressing upwardly against rollers 7. Obviously, this embodiment of the invention functions like the other ones.

While certain preferred embodiments have been specifically described, it will be understood that many other modifications and variations may occur to the skilled in the art, particularly after benefitting from the present teaching, without departing from the spirit and scope of the invention as defined in the appended claims.

What we claim is:

1. A unidirectional friction coupling comprising, in combination, an external ring member having a smooth inner race; an internal ring member coaxial with said race, said ring members being rotatable relative to each other about the common axis of said race and said internal ring member, and defining an annular space therebetween; a plurality of outwardly projecting bosses on said internal ring member, said bosses being circumferentially spaced about said common axis and defining therebetween a plurality of chambers in said space, said internal ring member having a face extending circumferentially between two bosses in each chamber, a portion of each face sloping radially outward from a point adjacent one of said two bosses toward the other boss in a predetermined circumferential direction, said face portion being formed with an inwardly elongated recess at said point, the direction of elongation of said recess defining with said face portion an obtuse angle slightly greater than a right angle; a roller member in each chamber, said roller member having an axis substantially parallel to said common axis and being circumferentially movable toward and away from a position of simultaneous frictional engagement with said race and said face portion; a pressure member movably guided in said recess; and resilient means for urging said pressure member outward of said recess into engagement with said roller member, whereby said roller member is urged into permanent engagement with said race and is spaced from said face portion when away from said position of simultaneous frictional engagement with said race and said face portion.

2. A coupling as in claim 1, wherein said direction of elongation of said recess defines another obtuse angle with a line perpendicular to said face portion, said other obtuse angle being substantially greater than said first mentioned obtuse angle.

3. The unidirectional friction coupling of claim 1, wherein said resilient means is a compression spring in each recess.

4. The unidirectional friction coupling of claim 1, wherein said resilient means is a continuous spring mounted in a circumferential annular groove in the internal ring member, said groove interconnecting circumferentially adjacent ones of said recesses.

References Cited in the file of this patent

UNITED STATES PATENTS

| | | |
|---|---|---|
| 2,082,842 | Marland | June 8, 1937 |
| 2,755,899 | Erickson | July 24, 1956 |

FOREIGN PATENTS

| | | |
|---|---|---|
| 806,230 | France | Sept. 21, 1936 |
| 227,666 | Switzerland | Sept. 16, 1943 |
| 1,072,862 | France | Mar. 17, 1954 |
| 1,154,767 | France | Nov. 12, 1957 |